May 27, 1947.                    W. B. ELLWOOD                    2,421,021
                              SPOT-WELDING MACHINE
                            Filed March 2, 1945                 2 Sheets-Sheet 1
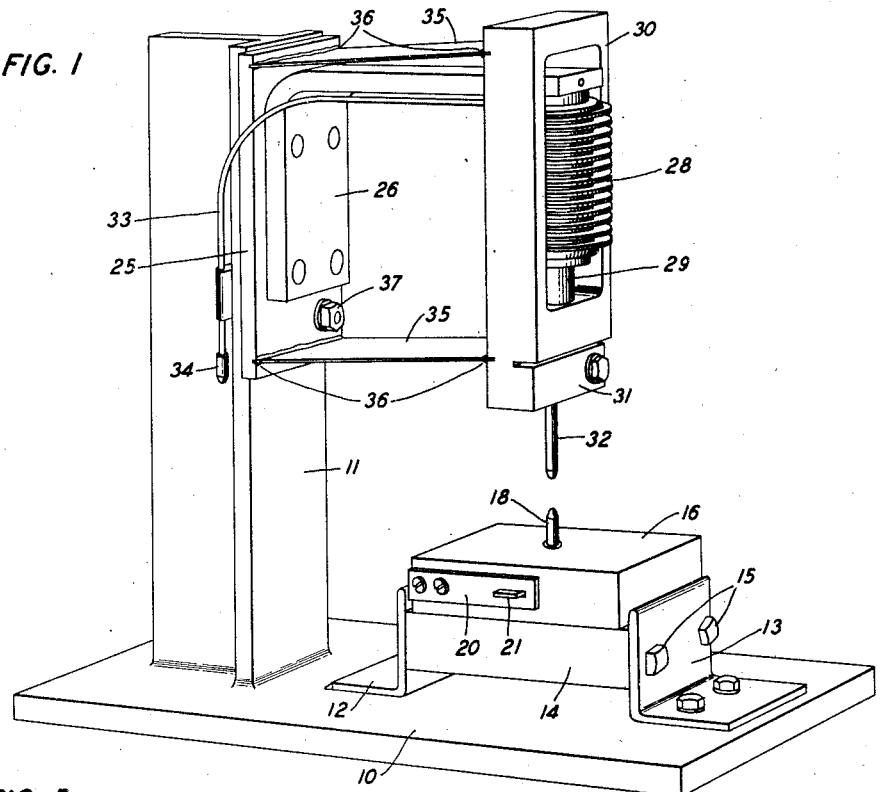
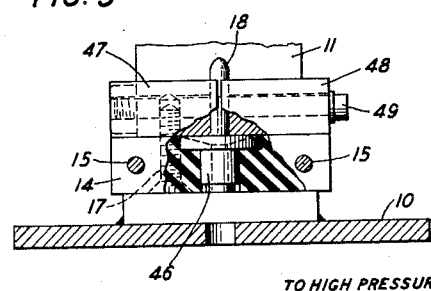
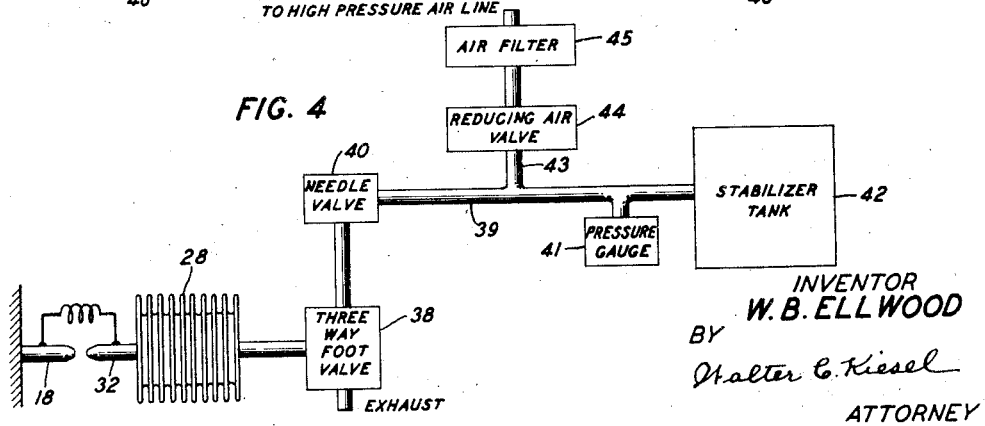
INVENTOR
W. B. ELLWOOD
BY
Walter E. Kiesel
ATTORNEY

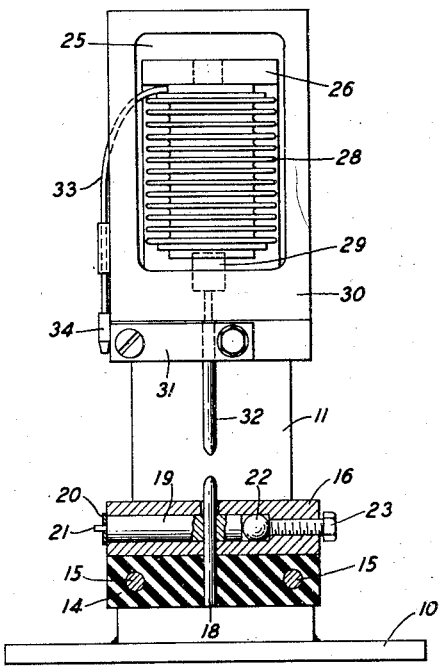
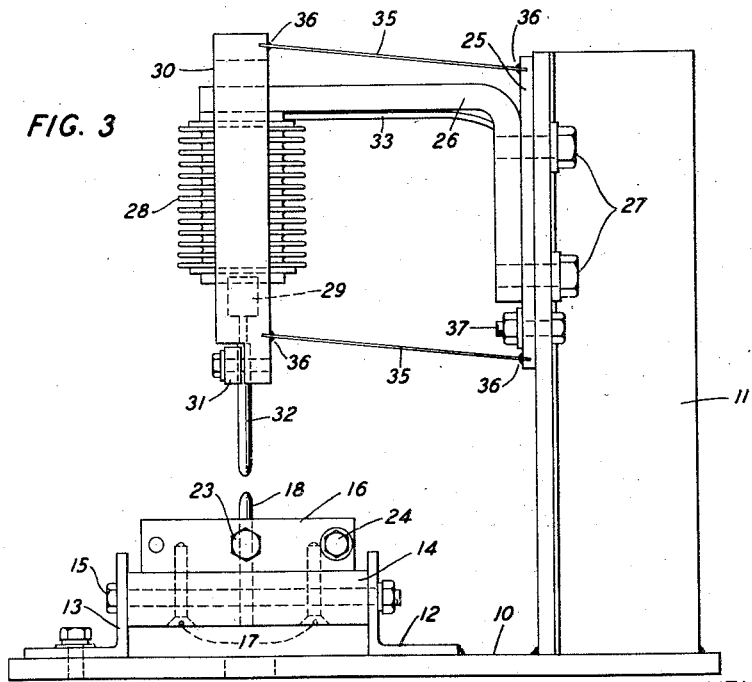

Patented May 27, 1947

2,421,021

UNITED STATES PATENT OFFICE 2,421,021

SPOT-WELDING MACHINE

Walter B. Ellwood, New York, N. Y., assignor to Bell Telephone Laboratories, Incorporated, New York, N. Y., a corporation of New York Application March 2, 1945, Serial No. 580,670

10 Claims. (Cl. 219—4)

This invention relates to spot-welding machines and more particularly to such machines for welding delicate materials, such as piece parts of apparatus, with fine precision.

An object of the invention is to control both the force and the rate of application to the weld to insure positive welding action.

Another object of the invention is to eliminate relative frictional movement of the electrodes during the welding operation.

A further object of the invention is to reduce the splashing of the welding metal caused by "hammer effect" and to improve the quality of the weld.

Another object of the invention is to facilitate precision welding by reproducible reciprocal movement of one electrode of the machine to permit welding of delicate parts, such as precious metal points on metal contacts, with accuracy heretofore unattainable.

These objects are fulfilled in accordance with this invention by the provision of a spot-welding machine or head including a pair of electrodes, one of which is reciprocally movable in aligned relation to the other electrode, and wherein the pressure force applied to the movable electrode is definitely controlled to produce the weld to insure precise juncture and welding pressure between the electrodes whereby delicate welding operations are performed without deleterious effects on the condition of the welded metals. This is accomplished by mounting the movable electrode in a frame member surrounding an expansible chamber rigidly secured to a support standard and guiding the frame member in a definite axial path of the aligned electrode by parallelopipedon cantilever spring members connecting the frame to the standard. The main features of the spring suspension of the movable electrode is realized in the freedom from friction, rotation or side play of the welding tips of the electrodes in contact with the metals being welded and the resulting efficiency in the production of the weld with a high degree of precision.

Another feature of the invention relates to the support and adjustment of the fixed electrode of the unit to facilitate centering and alignment with the movable electrode. This is accomplished by a ball and pin arrangement in the base to provide rigid clamping of the electrode in its proper position.

Other features and advantages of the invention are set forth in the following detailed description and the accompanying drawings showing one embodiment of the spot-welding machine.

Fig. 1 is a perspective view of the spot-welding machine of this invention showing the suspension assembly of the movable electrode.

Fig. 2 is a front elevational view of the same machine as Fig. 1 with the stationary electrode supporting assembly shown in section.

Fig. 3 is a side view of the spot-welding machine showing the position of the spring suspension between the movable electrode assembly and the support.

Fig. 4 shows the air supply system, partly diagrammatic, for the operation of the movable electrode in the machine of this invention.

Fig. 5 is a front elevation view of a modified base assembly, partly in section, to show the mounting of the stationary electrode; and Fig. 6 is a side view of the assembly shown in Fig. 5 with parts broken away to show details.

Referring to the drawings and particularly to Fig. 1, the welding machine of this invention has a metal base plate 10 which may be attached to a suitable bench and is provided with an upright support or standard of substantial rigidity which is welded to the base plate 10. This standard may, for example, be a suitable length of a metal beam of T-shaped cross-section mounted perpendicular to the base at the rear thereof to provide a suitable mounting surface facing the front of the machine to support the movable electrode head assembly therefrom. A metal angle bracket 12 is also rigidly secured to the base plate 10, for example by welding, in spaced frontal relation to the standard and a similar bracket 13 is adjustably secured to the base by screws in parallel relation to the bracket 12 and positioned toward the front of the base. An insulating block 14, of phenol fiber or similar insulating material, is mounted between the brackets and secured thereto by bolts 15 extending through the block and the brackets. An electrode metal block 16 is mounted on the insulating block 14 and secured thereto by screws 17 and blocks 14 and 16 being provided with central aligned apertures for the mounting of a stationary electrode 18 which extends above the metal block 16.

The stationary electrode block 16 is provided with a transverse bore, as shown in Fig. 2, to receive a cylindrical insert rod 19 which embraces the stationary electrode 18 and is held under tension in the bore by a leaf spring 20 mounted on one side of the block and provided with a slot engaging a rectangular fin 21 on the rod. The opposite end of the rod 19 engages a steel ball 22 located in the bore of the block and a screw 23 in the opposite side of the block engages the ball to adjust the relationship of the stationary electrode 18 with the movable electrode of the head assembly. The block 16 is also provided with a terminal 24, Fig. 3, adjacent the adjusting screw 23 to facilitate the application of welding current to the stationary electrode.

The movable electrode head assembly is supported from the standard to mount the movable electrode in operative spaced relation and in linear alignment with the stationary electrode on the base. The construction of the head assembly includes a conductive backing plate 25, such as copper, and an angle arm 26, both being secured to the transverse flat portion of the standard by bolts 27. A portion of the angle arm 26 extends outwardly from the standard perpendicular thereto so that the end thereof overhangs the axial position of the stationary electrode 18. An expansible pnuematic member or element 28 is suspended from the outer end of the arm 26, the expansible member being preferably a metal bellows which forms a pressure chamber which is expanded by a suitable pressure medium, such as compressed air. The bellows 28 is rigidly affixed to the arm 26 by an extension on the bellows member fitted into an opening in the arm and riveted therein. The bellows is also provided with a socket extension 29 at the lower end which is secured in a recess portion of a metallic frame member 30 which surrounds the bellows and the projecting end of the arm 26 so that the frame is virtually attached to the lower end of the bellows and is reciprocally movable therewith in relation to the arm 26. The frame 30 is provided with a clamping portion 31 on the lower end to rigidly attach a movable electrode 32 to the frame and the socket 29 on the bellows element. A flexible pipe 33 is attached to the stationary portion of the bellows at the top thereof and extends rearwardly to the standard where it is secured by a clip and the termination of the pipe is provided with a coupling nipple 34 for connecting a supply of air to the bellows to reciprocally actuate the bellows and the accompanying frame member and movable electrode 32 in relation to the stationary electrode 18 and thereby apply any suitable pressure force at the tips of the electrodes where a weld is produced.

The frame member 30 supporting the movable electrode is suspended and guided in axial relation to the stationary electrode of the unit by a pair of parallelopipedon cantilever flat springs 35, preferably of copper, mounted in slightly angular positions at opposite ends of the frame member 30 and extending towards the backing plate 25 on the standard. Both the backing plate and the frame are provided with transverse slots 36 in which the ends of the springs are mounted and secured therein by solder. The springs are relatively wide and preferably as wide as the corresponding widths of the frame and backing plate to which they are attached. The flat spring suspension of the frame eliminates twisting or side play in the movement of the frame and insures a smooth uniform motion along the axis of the welding electrodes with a definite reproducible trajectory without friction at the electrode points. The parallel springs also function as a positive guide for the frame member 30 by the resilient hinge effect generated at the point of contact of the springs with the backing plate so that the movable electrode 32 is always axially movable with respect to the stationary electrode. The axial guiding of the movable electrode eliminates "stick-slip" friction during the motion of the electrodes thereby reducing splashing of the molten metal during the welding operation and the corresponding precise control of the force applied to the weld prevents "hammer effect" at the point of weld so that consequent damage to delicate parts is avoided and the welding of such parts is performed with a high degree of precision. A terminal connection 37 is attached to backing plate 25 to supply the movable electrode 32 with welding current, the parallel suspension springs 35 serving as the current carrying conductors to the frame and welding electrode 32 thereby avoiding auxiliary cable conductors for the movable electrode and also facilitates cooling of the welding tip by the heat dissipating characteristics of the springs.

The precision welding accomplished by the accurate control of the pneumatic power or pressure applied to the weld due to the coaction of the expansible bellows, frame member and springs insures the positive welding of delicate materials, such as minute noble metal contacts and delicate springs, which must be accurately welded to perform their appropriate function. Furthermore, the pressure applied to the weld and the rate of application is accurately controlled by a system of air supplied to the bellows and the reproducible reciprocal actuation of the movable electrode 32 in the welding head assembly. As shown in Fig. 4, the air pressure from a suitable tank is supplied to the bellows by a three-way foot valve 38 which permits the operator to position the parts to be welded in suitable relation with respect to the electrodes with both hands and thereby attain more accurate results. The foot valve is connected to a conduit 39 having a suitable needle valve 40 therein to control the rate of flow of the pressure medium and a suitable gauge 41 is connected to the conduit to register the pressure in the system. A stabilizer tank 42 may be connected to the conduit to equalize the pressure in the system. A main conduit 43 is connected to the supply conduit 39 and contains a reducing valve 45 and an air filter 46 to regulate the final pressure from the supply source and remove impurities in the high pressure medium.

The stationary electrode assembly may be as shown in the modification in Figs. 5 and 6 in which the insulating block 14 is provided with a central countersunk base to receive a flanged tubular sleeve or funnel 46 which permits the welding fluid, such as alcohol, to be drained off and thereby prevent swelling of the block. The stationary electrode 18 is clamped in the base by a two-part metal block having one-half part 47 rigidly secured to the insulating block 14 by screws 17 and a slidable half part 48 cooperates with the stationary part by a pair of screw bolts 49 extending horizontally through the two part block to embrace and rigidly secure the electrode 18 in upright position with respect to the movable electrode 32.

While the invention has been disclosed in the particular embodiments above described, it is, of course, understood that various modifications may be made in the detailed assembly without departing from the scope of the invention as defined in the appended claims.

What is claimed is:

1. An electric spot-welding machine comprising a base, an electrode mounted on said base, a second electrode, means for moving said second electrode toward and away from said first electrode, and a pair of parallelopipedon springs for guiding the movement of said second electrode.

2. A spot-welding machine comprising a rigid standard, a stationary electrode, a movable electrode, an expansible pneumatic member affixed to said standard and coupled to said movable electrode, a frame member secured to said movable electrode, and parallelopipedon resilient members supporting said frame member on said standard.

3. A spot-welding machine comprising a rigid standard, a stationary electrode, a movable electrode, an expansible pneumatic member affixed to said standard and coupled to said movable electrode, a frame member surrounding said expansible member, said movable electrode extending through one end of said frame member in alignment with said stationary electrode, and parallelopipedon resilient members supporting said frame member on said standard.

4. A spot-welding machine comprising a rigid standard, a stationary electrode, a movable electrode, an expansible pneumatic member affixed to said standard and coupled to said movable electrode, a frame member secured to said movable electrode, and flat cantilever suspension springs extending between said frame member and said standard.

5. An electric spot welder comprising a base having an upright support, a stationary electrode projecting from said base, a rigid arm extending from said support, an expansible bellows attached to said arm, a movable frame carried by said bellows, an electrode associated with same frame and movable therewith in relation to said stationary electrode, and parallelopipedon resilient means extending between said support and said frame.

6. An electric spot welder comprising a base having an upright support member, a stationary electrode projecting from said base parallel to said support member, a rigid arm extending from said support member perpendicular thereto, an expansible bellows element carried by and suspended from said arm, means for supplying air pressure to said bellows element, a movable metallic member secured to said element at its lower end, an electrode attached to said movable member and extending in line with and in spaced relation to said stationary electrode, and a pair of parallel stiff resilient blades supporting opposite ends of said movable member from said upright support.

7. In a spot-welding machine including a movable electrode and a stationary electrode, a base supporting said stationary electrode, means for supporting said stationary electrode in said base, and adjustable means in said base for preventing misalignment of said stationary electrode with said movable electrode as a result of said supporting means.

8. In a spot-welding machine including a movable electrode and a stationary electrode, a base supporting said stationary electrode, means for clamping said stationary electrode in said base, an apertured rod extending through said base and embracing said stationary electrode, an adjusting element disposed opposite said rod in said base, and a spherical contact member between said rod and adjusting element.

9. In a spot-welding machine including a movable electrode and a stationary electrode, a base supporting said stationary electrode, means for supporting said stationary electrode in said base, an apertured rod extending through said base and embracing said stationary electrode, an adjusting element disposed opposite said rod in said base, a contact ball between said rod and adjusting element, and a tension spring on said base engaging said rod.

10. An electric spot-welding machine comprising a base support, an upright standard secured to said support, a pair of angle brackets secured to said base support, an insulating block supported between said brackets, a metallic plate secured to said block, a stationary electrode clamped in said plate, means for adjusting the alignment of said electrode in said plate, an expansible bellows member having one end secured to said standard, a rectangular frame surrounding said bellows and secured to the opposite end thereof, a movable electrode carried by said frame and projecting toward said stationary electrode, and a pair of parallel leaf springs extending between said standard and said frame.

WALTER B. ELLWOOD.

REFERENCES CITED

The following references are of record in the file of this patent:

UNITED STATES PATENTS

| Number | Name | Date |
|---|---|---|
| 1,326,601 | Ledwinka | Dec. 30, 1919 |
| 1,986,512 | Meadowcroft | June 1, 1935 |
| 2,122,933 | Eckman | July 5, 1938 |
| 2,343,686 | Martindell | Mar. 7, 1944 |
| 1,228,540 | Lachman | June 5, 1917 |
| 2,145,274 | Pfanstiehl | Jan. 31, 1939 |

FOREIGN PATENTS

| Number | Country | Date |
|---|---|---|
| 457,723 | Germany | Mar. 22, 1928 |